(12) United States Patent
Amizur

(10) Patent No.: US 11,026,207 B2
(45) Date of Patent: *Jun. 1, 2021

(54) APPARATUS, SYSTEM AND METHOD OF FINE TIMING MEASUREMENT (FTM)

(71) Applicant: INTEL IP CORPORATION, Santa Clara, CA (US)

(72) Inventor: Yuval Amizur, Kfar-Saba (IL)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/895,347

(22) Filed: Jun. 8, 2020

(65) Prior Publication Data

US 2020/0305110 A1 Sep. 24, 2020

Related U.S. Application Data

(63) Continuation of application No. 16/227,321, filed on Dec. 20, 2018, now Pat. No. 10,701,660, which is a continuation of application No. 15/083,603, filed on Mar. 29, 2016, now Pat. No. 10,200,964.

(60) Provisional application No. 62/249,427, filed on Nov. 2, 2015.

(51) Int. Cl.
*H04W 64/00* (2009.01)
*H04W 56/00* (2009.01)
*G01S 5/00* (2006.01)
*G01S 13/74* (2006.01)
*G01S 13/76* (2006.01)

(52) U.S. Cl.
CPC .......... *H04W 64/00* (2013.01); *G01S 5/00* (2013.01); *G01S 13/74* (2013.01); *G01S 13/765* (2013.01); *H04W 56/00* (2013.01)

(58) Field of Classification Search
CPC .................................................. H04W 64/00
See application file for complete search history.

(56) References Cited

U.S. PATENT DOCUMENTS

| 9,237,546 | B1 * | 1/2016 | Zhang | H04W 4/029 |
| 9,320,010 | B2 * | 4/2016 | Segev | G01S 13/878 |
| 9,781,615 | B2 | 10/2017 | You et al. | |
| 10,200,964 | B2 * | 2/2019 | Amizur | H04W 64/00 |

(Continued)

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

(Continued)

*Primary Examiner* — Andrew Lai
*Assistant Examiner* — Andrew C Lee
(74) *Attorney, Agent, or Firm* — Shichrur & Co.

(57) ABSTRACT

Some demonstrative embodiments include apparatuses, systems and/or methods of Fine Timing Measurement (FTM). For example, a first wireless station may be configured to transmit an FTM request message to a second wireless station; to transmit a first Non Data Packet (NDP) to the second wireless station; to process an FTM response message from the second wireless station; and to process a second NDP from the second wireless station.

20 Claims, 8 Drawing Sheets

(56) References Cited

U.S. PATENT DOCUMENTS

| | | | |
|---|---|---|---|
| 2011/0205968 A1* | 8/2011 | Kim | H04W 72/085 370/328 |
| 2013/0273935 A1 | 10/2013 | Amizur et al. | |
| 2014/0080420 A1* | 3/2014 | Yang | H04B 7/0417 455/63.4 |
| 2014/0171109 A1* | 6/2014 | Segev | G01S 5/0027 455/456.1 |
| 2014/0171169 A1 | 6/2014 | Hampton | |
| 2014/0185709 A1 | 7/2014 | Amizur | |
| 2014/0187259 A1* | 7/2014 | Kakani | H04W 64/00 455/456.1 |
| 2014/0301219 A1 | 10/2014 | Ben-Haim et al. | |
| 2014/0335885 A1* | 11/2014 | Steiner | H04W 64/00 455/456.1 |
| 2014/0355462 A1* | 12/2014 | Aldana | G01S 5/0072 370/252 |
| 2015/0063138 A1* | 3/2015 | Aldana | G01S 5/0081 370/252 |
| 2015/0094103 A1* | 4/2015 | Wang | H04W 4/023 455/456.6 |
| 2015/0168536 A1* | 6/2015 | Banin | G01S 5/0284 455/456.2 |
| 2015/0264530 A1* | 9/2015 | Prechner | H04W 4/33 455/456.2 |
| 2015/0281993 A1* | 10/2015 | Chen | H04B 7/024 370/338 |
| 2015/0341750 A1* | 11/2015 | Hayes | H04W 64/003 370/328 |
| 2015/0350936 A1* | 12/2015 | Qi | H04W 24/02 370/252 |
| 2015/0382143 A1 | 12/2015 | Lindskog et al. | |
| 2015/0382152 A1 | 12/2015 | Lindskog et al. | |
| 2016/0014711 A1 | 1/2016 | Aldana | |
| 2016/0262122 A1* | 9/2016 | Aldana | H04J 3/0667 |
| 2016/0366548 A1* | 12/2016 | Wang | H04W 4/023 |
| 2016/0366606 A1* | 12/2016 | Steiner | G01S 13/765 |
| 2017/0041750 A1* | 2/2017 | Jose | G01S 5/10 |
| 2017/0086024 A1* | 3/2017 | Do | G01S 13/825 |
| 2017/0127412 A1 | 5/2017 | Amizur | |
| 2019/0182791 A1 | 6/2019 | Amizur | |

OTHER PUBLICATIONS

IEEE Std 802.11ac™-2013. IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz, Dec. 11, 2013, 424 pages.

Office Action for U.S. Appl. No. 15/083,603 dated Dec. 1, 2017, 21 pages.

Office Action for U.S. Appl. No. 15/083,603, dated Jun. 27, 2018, 19 pages.

Notice of Allowance for U.S. Appl. No. 15/083,603, dated Sep. 20, 2018, 10 Pages.

Office Action for U.S. Appl. No. 16/227,321, dated Dec. 13, 2019, 18 pages.

Notice of Allowance for U.S. Appl. No. 16/227,321, dated Feb. 28, 2020, 10 Pages.

\* cited by examiner

APPARATUS, SYSTEM AND METHOD OF FINE TIMING MEASUREMENT (FTM)

CROSS REFERENCE

This Application is a Continuation of U.S. patent application Ser. No. 16/227,321 entitled "APPARATUS, SYSTEM AND METHOD OF FINE TIMING MEASUREMENT (FTM)", filed Dec. 20, 2018 (U.S. Pat. No. 10,701,660), which is a Continuation of U.S. patent application Ser. No. 15/083,603 entitled "APPARATUS, SYSTEM AND METHOD OF FINE TIMING MEASUREMENT (FTM)", filed Mar. 29, 2016 (U.S. Pat. No. 10,200,964), which claims the benefit of and priority from U.S. Provisional Patent Application No. 62/249,427 entitled "APPARATUS, SYSTEM AND METHOD OF FINE TIMING MEASUREMENT (FTM)", filed Nov. 2, 2015, the entire disclosure of which is incorporated herein by reference.

TECHNICAL FIELD

Embodiments described herein generally relate Fine Timing Measurement (FTM).

BACKGROUND

Outdoor navigation is widely deployed thanks to the development of various global-navigation-satellite-systems (GNSS), e.g., Global Positioning System (GPS), GALILEO, and the like.

Recently, there has been a lot of focus on indoor navigation. This field differs from the outdoor navigation, since the indoor environment does not enable the reception of signals from GNSS satellites. As a result, a lot of effort is being directed towards solving the indoor navigation problem.

A Fine Timing Measurement (FTM) may include measuring a Round Trip Time (RTT) from a wireless station (STA) to a plurality of other STAs, for example, to perform trilateration and/or calculate the location of the STA.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
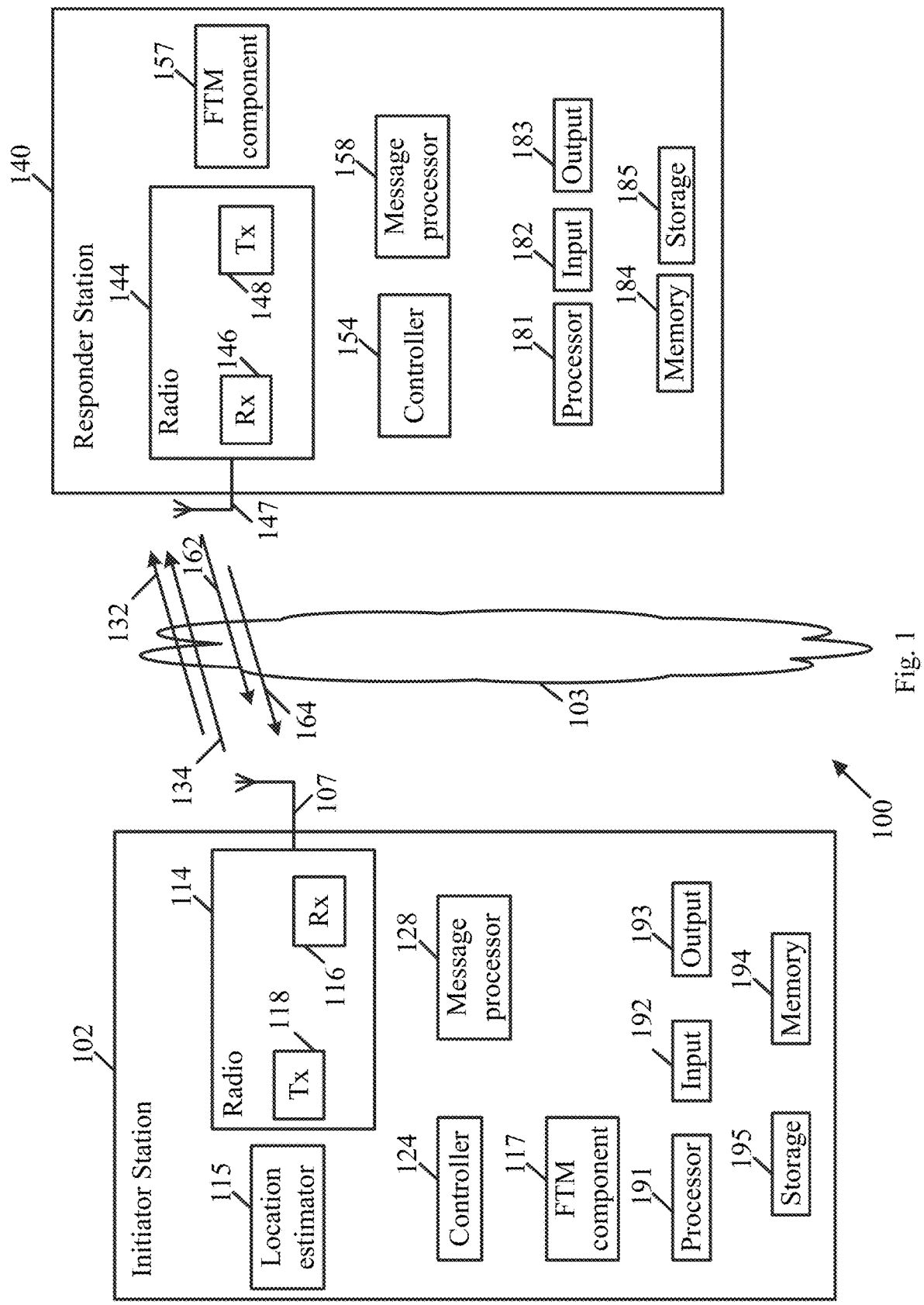
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a sensor device, a wearable device, in Internet of Things (IoT) device, a Mobile Device (MD), a wireless station (STA), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including *IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications*, Mar. 29, 2012; *IEEE*802.11*ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz"*, December, 2013); *IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band"*, 28 Dec. 2012); IEEE-802.11REVmc (*"IEEE 802.11-REVmc™/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"*); and/or IEEE 802.11az (*IEEE 802.11az, Next Generation Positioning*)) and/or future versions and/or derivatives thereof, devices and/or networks operating in accordance with existing WiFi Alliance (WFA) Specifications (including *Wi-Fi Neighbor Awareness Networking (NAN) Technical Specification, Version 1.0,* May 1, 2015) and/or future versions and/or derivatives thereof, devices and/or networks operating in accordance with existing WFA Peer-to-Peer (P2P) specifications (including *WiFi P2P technical specification, version 1.5,* Aug. 4, 2014) and/or future versions and/or derivatives thereof, devices and/or networks operating in accordance with existing Wireless-Gigabit-Alliance (WGA) specifications (including *Wireless Gigabit Alliance, Inc WiGig MAC and PHY Specification Version 1.1,* April 2011, *Final specification*) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), Spatial Divisional Multiple Access (SDMA), FDM Time-Division Multiplexing (TDM), Time-Division Multiple Access (TDMA), Multi-User MIMO (MU-MIMO), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a wireless fidelity (WiFi) network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 2.4 GHz or 5 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a WLAN frequency band, a WPAN frequency band, and the like.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrase "peer to peer (PTP) communication", as used herein, may relate to device-to-device communication over a wireless link ("peer-to-peer link") between devices. The PTP communication may include, for example, a WiFi Direct (WFD) communication, e.g., a WFD Peer to Peer (P2P) communication, wireless communication over a direct link within a Quality of Service (QoS) basic service set (BSS), a tunneled direct-link setup (TDLS) link, a STA-to-STA communication in an independent basic service set (IBSS), or the like.

Some demonstrative embodiments are described herein with respect to WiFi communication. However, other embodiments may be implemented with respect to any other communication scheme, network, standard and/or protocol.

Reference is now made to FIG. 1, which schematically illustrates a block diagram of a system 100, in accordance with some demonstrative embodiments.

As shown in FIG. 1, in some demonstrative embodiments system 100 may include a wireless communication network including one or more wireless communication devices, e.g., wireless communication devices 102 and/or 140.

In some demonstrative embodiments, wireless communication devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, a handheld device, an Internet of Things (IoT) device, a sensor device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 and/or device 140 may include, operate as, and/or perform the functionality of one or more STAs. For example, device 102 may include at least one STA, and/or device 140 may include at least one STA.

In some demonstrative embodiments, device 102 and/or device 140 may include, operate as, and/or perform the functionality of one or more WLAN STAs.

In some demonstrative embodiments, device 102 and/or device 140 may include, operate as, and/or perform the functionality of one or more Wi-Fi STAs.

In some demonstrative embodiments, device 102 and/or device 140 may include, operate as, and/or perform the functionality of one or more BT devices.

In some demonstrative embodiments, device 102 and/or device 140 may include, operate as, and/or perform the functionality of one or more Neighbor Awareness Networking (NAN) STAs.

In some demonstrative embodiments, one of wireless communication devices 102 and/or 140, e.g., device 102, may include, operate as, and/or perform the functionality of a non-AP STA, and/or one of wireless communication devices 102 and/or 140, e.g., device 140, may include, operate as, and/or perform the functionality of an AP STA. In other embodiments, devices 102 and/or 140 may operate as and/or perform the functionality of any other STA.

For example, the AP may include a router, a PC, a server, a Hot-Spot and/or the like.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a non-access-point (non-AP) station (STA) may include a STA that is not contained within an AP. The non-AP STA may perform any other additional or alternative functionality.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102 and/or 140 may be capable of communicating content, data, information and/or signals via a wireless medium (WM) 103. In some demonstrative embodiments, wireless medium 103 may include, for example, a radio channel, a cellular channel, a Global Navigation Satellite System (GNSS) Channel, an RF channel, a WiFi channel, an IR channel, a Bluetooth (BT) channel, and the like.

In some demonstrative embodiments, wireless communication medium 103 may include a wireless communication channel over a 2.4 Gigahertz (GHz) frequency band, or a 5 GHz frequency band, a millimeterWave (mmWave) frequency band, e.g., a 60 GHz frequency band, a S1G band, and/or any other frequency band.

In some demonstrative embodiments, devices 102 and 140 may include one or more radios to perform wireless communication between devices 102, 140 and/or one or more other wireless communication devices. For example, device 102 may include a radio 114, and/or device 140 may include a radio 144.

In some demonstrative embodiments, devices 102 and/or 140 may include one or more radios including circuitry and/or logic to perform wireless communication between devices 102, 140 and/or one or more other wireless communication devices. For example, device 102 may include a radio 114, and/or device 140 may include a radio 144.

In some demonstrative embodiments, radios 114 and/or 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radios 114 and/or 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114 and/or radio 144, transmitters 118 and/or 148, and/or receivers 116 and/or 148 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative embodiments, radios 114 and/or 144 may be configured to communicate over a 2.4 GHz band, a 5 GHz band, an mmWave band, a S1G band, and/or any other band.

In some demonstrative embodiments, radios 114 and/or 144 may include, or may be associated with, one or more antennas 107 and/or 147, respectively.

In one example, device 102 may include a single antenna 107. In another example, device 102 may include two or more antennas 107.

In one example, device 140 may include a single antenna 147. In another example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140 and/or one or more other devices, e.g., as described below.

In some demonstrative embodiments, controllers 124 and/or 154 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, wireless communication devices 102 and/or 140 may form, or may communicate as part of, a wireless local area network (WLAN).

In some demonstrative embodiments, wireless communication devices 102 and/or 140 may form, or may communicate as part of, a WiFi network.

In other embodiments, wireless communication devices 102 and/or 140 may form, and/or communicate as part of, any other network.

In some demonstrative embodiments, device 102 may include one or more applications configured to provide and/or to use one or more location based services, e.g., a social application, a navigation application, a location based advertising application, and/or the like. For example, device 102 may include an application 125 to be executed by device 102.

In some demonstrative embodiments, application 125 may use range information between devices 102 and 140, for example, to determine an estimated location of device 102, e.g., with respect to a coordinate system, e.g., a World Geodetic System 1984 (WGS84), and/or a local coordination.

In one example, device 102 may include a Smartphone and device 140 may include an AP, which is located in a shop, e.g., in a shopping mall. According to this example, application 125 may use the range information to determine a relative location of device 102 with respect to device 140, for example, to receive sale offers from the shop.

In another example, device 102 may include a mobile device and device 140 may include a responder station, which is located in a parking zone, e.g., of a shopping mall. According to this example, application 125 may use the range information to determine a location of device 102 in the parking zone, for example, to enable a user of device 102 to find a parking area in the parking zone.

In some demonstrative embodiments, device 102 may include a location estimator 115 configured to estimate a location of device 102, e.g., as described below.

In some demonstrative embodiments, at least part of the functionality of location estimator 115 may be implemented as part of controller 124.

In other embodiments, the functionality of location estimator 115 may be implemented as part of any other element of device 102.

In some demonstrative embodiments, location estimator 115 may be configured to estimate the location of device 102, for example, based on time based range measurements, for example, with device 140 and/or one or more other devices.

In some demonstrative embodiments, the time based range measurements may be performed using WLAN communications, e.g., WiFi. For example, using WiFi to perform the time based range measurements may enable, for example, increasing an indoor location accuracy of the location estimation of device 102, e.g., in an indoor environment.

In some demonstrative embodiments, the time based range measurements may include a round trip time (RTT) measurement (also referred to as Time of Flight (ToF) procedure).

In some demonstrative embodiments, a ToF value may be defined as the overall time a signal propagates from a first station, e.g., device 102, to a second station, e.g., device 140, and back to the first station. A distance between the first and second stations may be determined based on the ToF value, for example, by dividing the ToF value by two and multiplying the result by the speed of light.

In some demonstrative embodiments, the ToF measurement procedure may include a Fine Timing Measurement (FTM) procedure.

In some demonstrative embodiments, device 102 and/or device 140 may be configured to perform one or more FTM measurements, ToF measurements, positioning measurements and/or communications, ranging measurements and/or communications, proximity measurements and/or communications, location estimation measurements and/or communications.

In some demonstrative embodiments, devices 102 and/or 140 may be configured to perform any other additional or alternative positioning measurements and/or communications, ranging measurements and/or communications, proximity measurements and/or communications, location estimation measurements and/or communications, for example, and/or according to any other additional or alternative procedure and/or protocol, e.g., an Received Signal Strength Indication (RSSI) procedure.

Some demonstrative embodiments are described below with respect to FTM measurements according to an FTM procedure. However, other embodiments may be implemented with respect to any other additional or alternative positioning measurements and/or communications, ranging measurements and/or communications, proximity measurements and/or communications, location estimation measurements and/or communications.

In some demonstrative embodiments, devices 102 and/or 140 may be configured to perform one or more FTM measurements, for example, using WLAN communications, e.g., WiFi. For example, using WiFi to perform time based range measurements, e.g., FTM measurements, may enable, for example, increasing an indoor location accuracy of the mobile devices, e.g., in an indoor environment.

In some demonstrative embodiments, in some cases, implementations and/or scenarios it may not be advantageous and/or effective to perform an FTM procedure, which may be performed during a plurality of bursts, which may include communicating a plurality of FTM measurement frames, and/or a plurality of corresponding acknowledge (Ack) frames. For example an FTM procedure in accordance with the *IEEE 802.11REVmc D4.0 Specification*, may not be affective, e.g., as described below with reference to FIG. 2.

Figure 2:
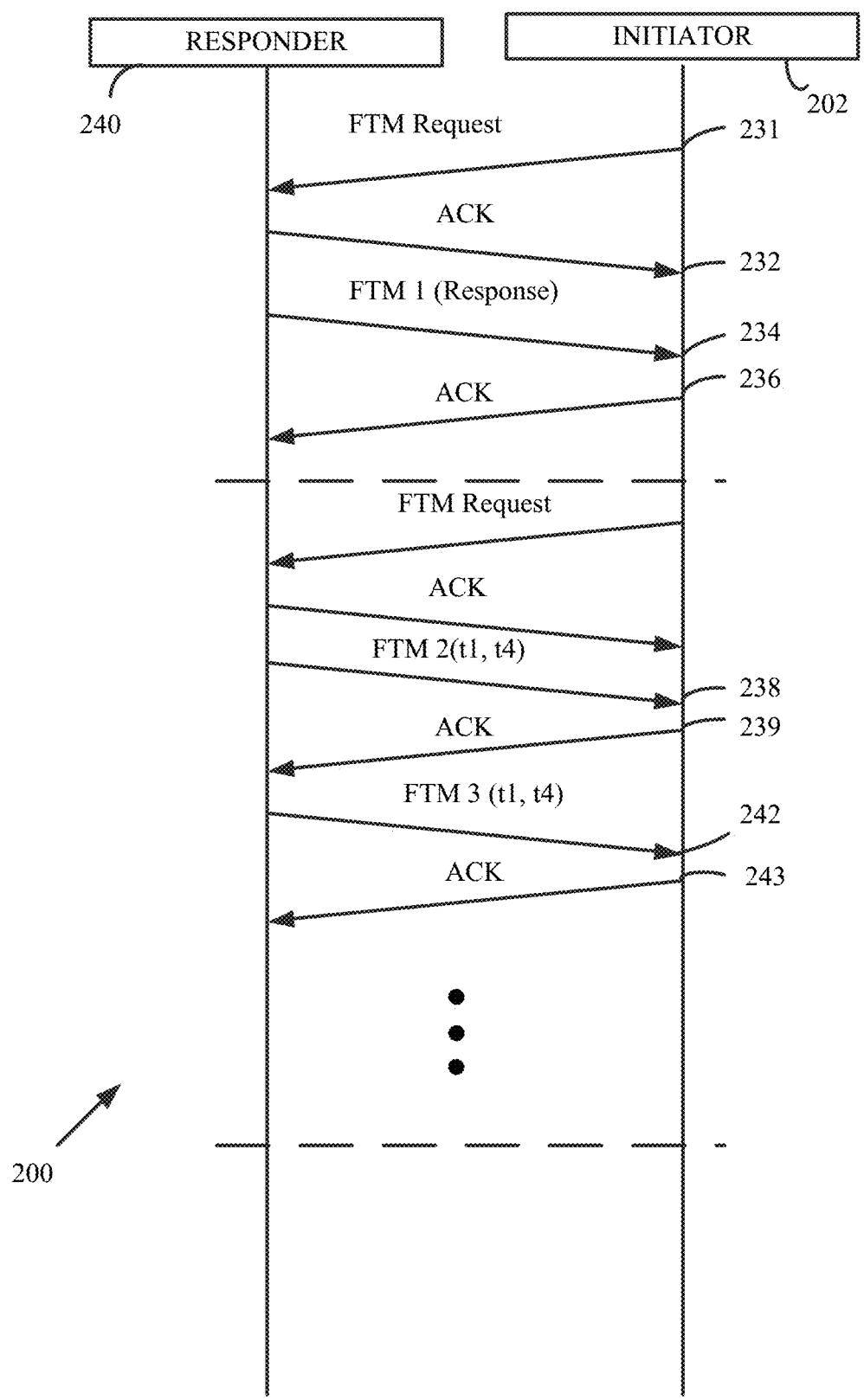
FIG. 2 is a schematic illustration of a Fine Timing Measurement (FTM) procedure.

Reference is made to FIG. 2, which schematically illustrates a sequence diagram, which demonstrates operations and interactions between a first wireless communication device 202 ("Initiating STA" or "initiator") and a second wireless communication device 240 ("Responding STA" or "responder"), of an FTM procedure 200, in accordance with some demonstrative embodiments.

FTM procedure 200 may be in accordance with the *IEEE 802.11REVmc D4.0 Specification*, and/or any other specification and/or protocol.

As shown in FIG. 2, device 202 may transmit to device 240 an FTM request message 231 to request to perform the FTM procedure 200 with device 240.

As shown in FIG. 2, device 240 may transmit an FTM request acknowledgement (ACK) 232 to device 202, to acknowledge receipt of the FTM request message 231, and to confirm the request to perform the FTM procedure.

As shown in FIG. 2, FTM procedure 200 may include an FTM measurement period, during which devices 202 and 240 may communicate FTM measurement frames, e.g., as described below.

As shown in FIG. 2, devices 202 and/or 240 may communicate the FTM measurement frames between devices 202 and 240 during the FTM measurement period, for example, to determine a Time of Flight (ToF) value between devices 202 and 240.

As shown in FIG. 2, device 240 may determine a time value, denoted t1, based on a time at which an FTM message 234 is transmitted to device 202. The time value t1 may be based on a Time of Departure (ToD), denoted ToD(M), of message 234.

As shown in FIG. 2, device 202 may receive message 234 and may determine a time value, denoted t2, e.g., based on a Time of Arrival (ToA), denoted ToA(M), of message 234.

As shown in FIG. 2, device 202 may determine a time value, denoted t3, based on a time at which a message 236 is transmitted to device 240. Message 236 may include, for example, an acknowledgement message transmitted in response to FTM message 234. The time value t3 may be based on a ToD, denoted ToD(ACK), of the message 236.

As shown in FIG. 2, device 240 may receive message 236 and may determine a time value, denoted t4, e.g., based on a ToA, denoted ToA(ACK), of message 236.

As shown in FIG. 2, device 240 may transmit an FTM message 238 to device 202. Message 238 may include, for example, information corresponding to the time value t1 and/or the time value t4. For example, message 238 may include a timestamp, e.g., a ToD timestamp, including the time value t1, and a timestamp, e.g., a ToA timestamp, including the time value t4.

As shown in FIG. 2, device 202 may receive message 238.

As shown in FIG. 2, device 202 may transmit a message 239 to device 240. Message 239 may include, for example, an acknowledgement message transmitted in response to message 238.

As shown in FIG. 2, device 240 may transmit an FTM message 242 to device 202. Message 242 may include, for example, information corresponding to the time value t1 and/or the time value t4, e.g., corresponding to the messages 238 and 239. For example, message 242 may include a timestamp, e.g., a ToD timestamp, including the time value t1 corresponding to the message 238, and a timestamp, e.g., a ToA timestamp, including the time value t4 corresponding to message 239.

As shown in FIG. 2, device 202 may receive message 242.

As shown in FIG. 2, device 202 may transmit a message 243 to device 240. Message 239 may include, for example, an acknowledgement message transmitted in response to message 242.

Device 202 may determine a ToF between device 202 and device 240, for example, based on message 238 and/or message 242. For example, device 202 may determine the ToF based on an average, or any other function, applied to the time values t1, t2, t3 and t4. For example, device 202 may determine the ToF, e.g., as follows:

$$\text{ToF} = [(t4-t1)-(t3-t2)]/2 \quad (1)$$

Device 202 may determine the distance between devices 202 and 240 based on the calculated ToF.

For example, device 202 may determine the distance, denoted $r_k$, e.g., as follows:

$$r_k = \text{ToF} * C \quad (2)$$

wherein C denotes the radio wave propagation speed.

In some demonstrative embodiments, FTM procedure 200 may have one or more disadvantages, inefficiencies and/or technical problems, e.g., as described below.

In some demonstrative embodiments, FTM procedure 200 may require at least three medium usages, e.g., waiting for a clear channel for three times.

In some demonstrative embodiments, FTM procedure 200 may have an unknown waiting time between a first FTM message, e.g., FTM message 234, and a second FTM message, e.g., FTM message 234. For example, device 202 may have to wait between the first and second messages for an unknown time, e.g., due to a calculation time of device 204 ("AP calculation time"), for example, to determine the time value t4.

In some demonstrative embodiments, the requirement to wait for an unknown time period between the first and second FTM messages may significantly increase a power consumption of device 202.

In some demonstrative embodiments, when waiting between the first and second FTM messages, device 202 may be required to remain off a main channel, e.g., a channel over which device 202 communicates with one or more other devices.

In some demonstrative embodiments, FTM procedure 200 may not support Multi-Input-Multi-Output (MIMO), for example, since ACK messages, e.g., messages 236, 239 and/or 243 may be communicated in a duplicate mode.

In some demonstrative embodiments, FTM procedure 200 may provide a non-symmetrical measurement. For example, in one direction, e.g., from device 240 to device 202, the measurement may be performed on a regular packet, e.g., FTM message 234, while in the other direction the measurement may be performed on a legacy duplicate ACK, e.g., message 236.

In some demonstrative embodiments, FTM procedure 200 may not be scalable, e.g., in terms of an AP computational load. For example, an AP calculation burden of an AP acting as responder device 240 may increase, e.g., as the number of users grows. For example, device 240 may have to perform multiple computations of the time value t4, e.g., if device 240 performs multiple FTM measurement with multiple users.

Referring back to FIG. 1, in some demonstrative embodiments, devices 102 and/or 140 may be configured to perform operations and/or communications of an FTM protocol, which may be configured to provide one or more benefits, to provide one or more advantages and/or to solve one or more of the problems and/or shortcomings of the FTM procedure 200 (FIG. 2), e.g., as described below.

In some demonstrative embodiments, the FTM protocol may be configured to perform one or more operations, functionalities, procedures, and/or communications, for example, in accordance with one or more mechanisms and/or protocols, for example, as described by US Patent Application Publication US 2014/0301219, entitled "Wireless network location techniques", published Oct. 9, 2014; US Patent Application Publication US 2015/0168536, entitled "SYSTEM AND METHOD FOR CHANNEL INFORMATION EXCHANGE FOR TIME OF FLIGHT RANGE DETERMINATION", published Jun. 18, 2015; and/or US Patent Application Publication US 2014/0185709, entitled "TRANSMITTER PRECODING FOR OPTIMIZING POSITIONING PERFORMANCE", published Jul. 3, 2014, e.g., as described below.

In some demonstrative embodiments, devices 102 and/or 140 may be configured to perform and/or communicate according to an FTM protocol, which may be atomic. For example, the FTM protocol may be performed during a single medium usage, e.g., as described below.

In some demonstrative embodiments, devices 102 and/or 140 may be configured to perform and/or communicate according to an FTM protocol, which may be configured to support MIMO and/or precoding techniques, e.g., as described below.

In some demonstrative embodiments, devices 102 and/or 140 may be configured to perform and/or communicate according to an FTM protocol, which may be configured to remove a burden of calculation from a responder device, e.g., an AP, and/or a need of an initiator device, e.g., a client, to wait for calculations performed by the responder device.

In some demonstrative embodiments, the FTM protocol may enable improved, and/or increased scalability and/or user experience, e.g., compared to the FTM procedure 200 (FIG. 2).

In some demonstrative embodiments, the FTM protocol may be configured to utilize one or more Null Data packets (NDPs), for example, in a manner similar to a beamforming procedure, e.g., as described below.

Figure 3:
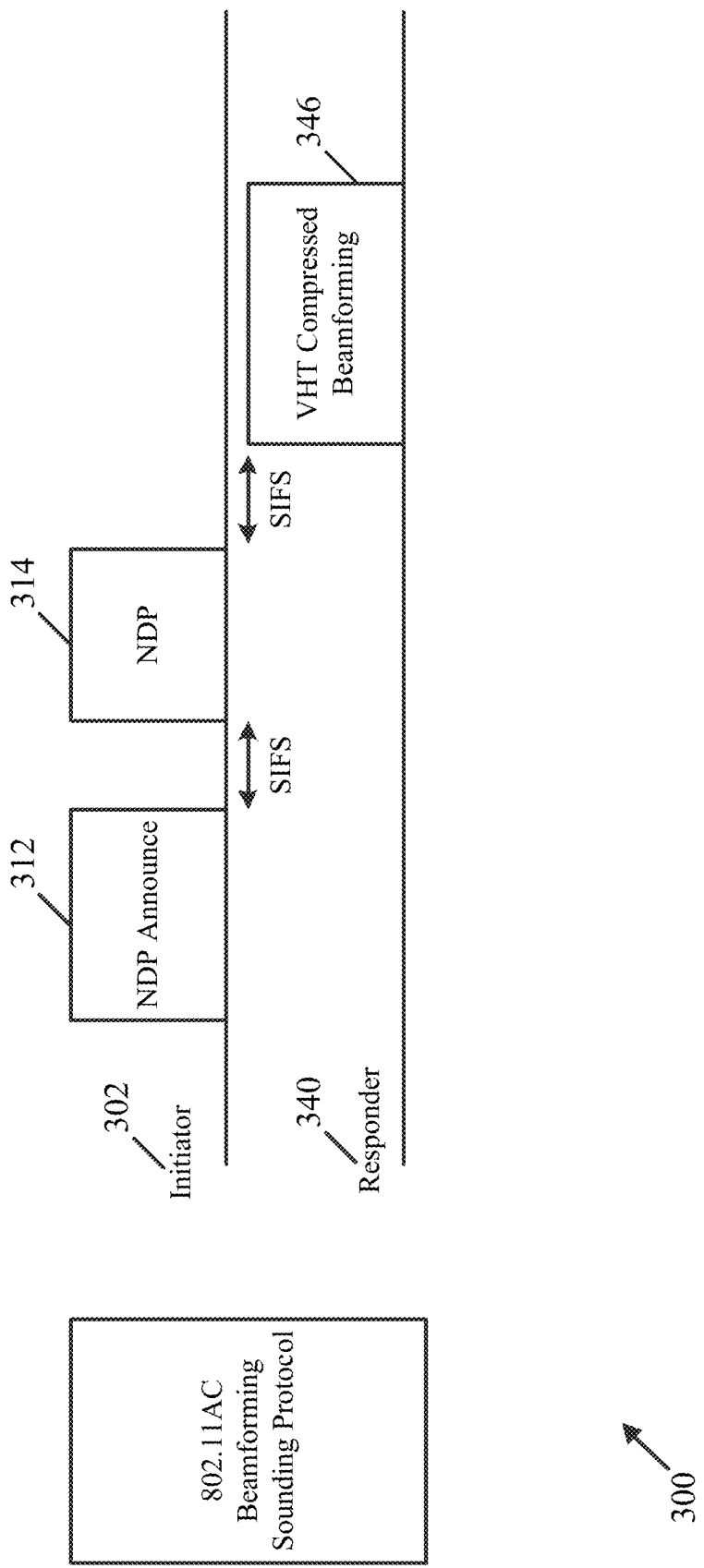
FIG. 3 is a schematic illustration of a Non-Data-Packet (NDP) sounding protocol, in accordance with some demonstrative embodiments.

Reference is made to FIG. 3, which schematically illustrates a Non-Data-Packet (NDP) sounding protocol 300 between an initiator, e.g., a beamforming initiator device 302, and a responder, e.g., a beamforming responder device 340.

As shown in FIG. 3, the beamforming protocol 300 may utilize one or more NDP transmissions, and/or one or more packet transmissions, e.g., as described below.

As shown in FIG. 3, the initiator device 302 may transmit an NDP announcement 312, and an NDP transmission 314.

As shown in FIG. 3, NDP transmission 314 may be subsequent to NDP announcement 312, and may be separated from NDP announcement 312, for example, by a Short Inter-Frame Space (SIFS).

As shown in FIG. 3, the responder device 340 may transmit to the initiator device 302 a very high throughput (VHT) compressed Beamforming packet 316 including channel information.

As shown in FIG. 3, packet 316 may be subsequent to NDP 314, and may be separated from NDP transmission 314 by a SIFS.

Referring back to FIG. 1, in some demonstrative embodiments, device 102 and/or device 140 may be configured to perform the FTM protocol, for example, using one or more NDPs, for example, in accordance with one or more operations of beamforming protocol 300 (FIG. 3), e.g., as described below.

In some demonstrative embodiments, device 102 and/or device 140 may be configured to perform the FTM protocol, for example, using one or more NDPs, and one or more FTM messages.

In some demonstrative embodiments, device 102 may perform the functionality of an initiator device to initiate the FTM protocol, and device 140 may perform the functionality of a responder device. For example, device 140 may include an AP, and/or device 102 may include a non-AP STA, for example, a mobile device, e.g., a Smartphone, which may initiate the FTM protocol with the AP, for example, to determine a location of the mobile device.

In some demonstrative embodiments, device 102 may include an FTM component 117, and/or device 140 may include an FTM component 157, which may be configured to perform one or more FTM measurements, operations and/or communications, e.g., as described below.

In some demonstrative embodiments, FTM components 117 and/or 157 may include, or may be implemented, using suitable circuitry and/or logic, e.g., controller circuitry and/or logic, processor circuitry and/or logic, memory circuitry and/or logic, and/or any other circuitry and/or logic, which may be configured to perform at least part of the functionality of FTM components 117 and/or 157. Additionally or alternatively, one or more functionalities of FTM components 117 and/or 157 may be implemented by logic, which may be executed by a machine and/or one or more processors, e.g., as described below.

In some demonstrative embodiments, FTM component 117 may be configured to perform one or more operations of, and/or at least part of the functionality of, message processor 128 and/or controller 124, for example, to trigger communication of one or more FTM messages and/or NDPs, e.g., as described below.

In some demonstrative embodiments, FTM component 157 may be configured to perform one or more operations of, and/or at least part of the functionality of, message processor 158 and/or controller 154, for example, to trigger communication of one or more FTM messages and/or NDPs, e.g., as described below.

In some demonstrative embodiments, FTM components 117 and/or 157 may be configured to trigger the FTM measurements, for example, periodically and/or or upon a request from an application executed by a device, for example, to determine an accurate location of the device.

In some demonstrative embodiments, FTM components 117 and/or 157 may be configured to perform one or more measurements according to the FTM protocol, e.g., as described below.

In some demonstrative embodiments, FTM components 117 and/or 157 may be configured to perform one or more proximity, ranging, and/or location estimation measurements, e.g., in an indoor location, based on the FTM measurements. For example, the FTM measurements may provide a relatively accurate estimation of location, range and/or proximity, e.g., in an indoor location.

Some demonstrative embodiments are described herein with respect to an FTM component, e.g., FTM components 117 and/or 157, configured to perform measurements according to an FTM protocol and/or procedure. However, in other embodiments, the FTM component may be configured to perform any other additional or alternative type of Time of Flight (ToF) measurements, ranging measurements, positioning measurements, proximity measurements, and/or location estimation measurements, e.g., according to any additional or alternative protocol and/or procedure.

In some demonstrative embodiments, device 102 may initiate the FTM protocol, for example, to determine a location of device 102.

In some demonstrative embodiments, FTM component 117 may be configured to control, cause and/or trigger device 102 to transmit an FTM request 132 to device 140.

In one example, message processor 128 may generate FTM request 132, and/or transmitter 118 may transmit FTM request 132 to device 140.

In some demonstrative embodiments, device 140 may receive FTM request 132 from device 102.

In some demonstrative embodiments, FTM component 157 may be configured to control, cause and/or trigger device 140 to process FTM request 132 from device 102.

In one example, receiver 146 may receive FTM request 132 from device 102, and/or message processor 158 may be configured to access, process, and/or decode FTM request 132.

In some demonstrative embodiments, FTM component 117 may be configured to control, cause and/or trigger device 102 to transmit an NDP 134 to device 140.

In one example, message processor 128 may generate NDP 134, and/or transmitter 118 may transmit NDP 134 to device 140.

In some demonstrative embodiments, device 140 may receive NDP 134 from device 102.

In some demonstrative embodiments, FTM component 157 may be configured to control, cause and/or trigger device 140 to process NDP 134 from device 102.

In one example, receiver 146 may receive NDP 134 from device 102, and/or message processor 158 may be configured to access, process, and/or decode NDP 134.

In some demonstrative embodiments, FTM component 157 may be configured to control, cause and/or trigger device 140 to transmit an FTM response 162 to device 102, for example, after NDP 134, e.g., in response to FTM request 132 and/or NDP 134.

In one example, message processor 158 may generate FTM response 162, and/or transmitter 148 may transmit FTM response 162 to device 102.

In some demonstrative embodiments, device 102 may receive the FTM response 162 from device 102.

In some demonstrative embodiments, FTM component 117 may be configured to control, cause and/or trigger device 102 to process FTM response 162 from device 140.

In one example, receiver 116 may receive FTM response 162 from device 140, and/or message processor 128 may be configured to access, process, and/or decode FTM response 162.

In some demonstrative embodiments, FTM component 157 may be configured to control, cause and/or trigger device 140 to transmit an NDP 164 to device 102, for example, after NDP 134, e.g., in response to FTM request 132 and/or NDP 134.

In one example, message processor 158 may generate NDP 164, and/or transmitter 148 may transmit NDP 164 to device 102.

In some demonstrative embodiments, device 102 may receive the NDP 164 from device 102.

In some demonstrative embodiments, FTM component 117 may be configured to control, cause and/or trigger device 102 to process NDP 164 from device 140.

In one example, receiver 116 may receive NDP 164 from device 140, and/or message processor 128 may be configured to access, process, and/or decode FTM response 162.

In some demonstrative embodiments, FTM component 117 may be configured to control, cause and/or trigger device 102 to determine a range between devices 102 and 140 based on at least a ToD of the NDP 134, denoted ToD(NDP1), and a ToA of the NDP 164, denoted ToA (NDP2), e.g., as described below.

In some demonstrative embodiments, FTM component 117 may be configured to control, cause and/or trigger device 102 to determine the range between devices 102 and 140 based on the ToD(NDP1), a ToA of the NDP 134, denoted ToA(NDP1), a ToD of the NDP 164, denoted ToA(NDP2), and the ToA(NDP2), e.g., as described below.

For example, the range, denoted r between devices 102 and 140 may be calculated, e.g., as follows:

$$r=\{(ToA(NDP2)-ToD(NDP1)-(ToA(NDP2)-ToA(NDP2)))/2\}*c \quad (3)$$

In some demonstrative embodiments, the FTM response 162 may include information, which may be, for example, different from the information included in the FTM messages 238 and/or 242 (FIG. 2) according to the FTM procedure 200 (FIG. 2), e.g., as described below.

In some demonstrative embodiments, the information in FTM response 162 may enable device 102 to determine the range between devices 102 and 140, e.g., as described below.

In some demonstrative embodiments, FTM response 162 may include the ToD of the NDP 164.

In some demonstrative embodiments, FTM component 157 may determine the ToD of the NDP 164, for example, based on a scheduled time to transmit NDP 164.

In some demonstrative embodiments, the information in FTM response 162 may enable device 102 to determine the ToA of the NDP 134, e.g., as described below.

In some demonstrative embodiments, FTM response 162 may include timing information indicative of the ToA of the NDP 134.

In some demonstrative embodiments, the timing information indicative of the ToA of the NDP 134 may include a time value, which may be based on a detected beginning of a symbol of the NDP 134.

In some demonstrative embodiments, FTM response 162 may include channel estimation information of a channel between devices 102 and 140, e.g., as described below.

In some demonstrative embodiments, FTM component 117 may be configured to control, cause and/or trigger device 102 to determine the ToA(NDP1), based on the time value, and the channel estimation information, e.g., as described below with reference to FIG. 4.

In some demonstrative embodiments, it may be advantageous to have device 140 to determine the time value representing the ToA(NDP1), for example, the time value, which may be based on a detected beginning of a symbol of the NDP 134, e.g., instead of requiring device 140 to determine the TOA(NDP1). For example, the beginning of a symbol of the NDP 134 may be a parameter, which may be received from a modulator-demodulator (MODEM) of device 140, e.g., without requiring device 140 to perform any further and/or dedicated calculation.

In some demonstrative embodiments, providing to device 102 the time value representing the ToA(NDP1), for example, the time value, which may be based on a detected beginning of a symbol of the NDP 134, may enable determining the ToA(NDP1) at device 102, for example, by performing the channel analysis at device 102, e.g., based on the channel information received from device 140.

Figure 4:
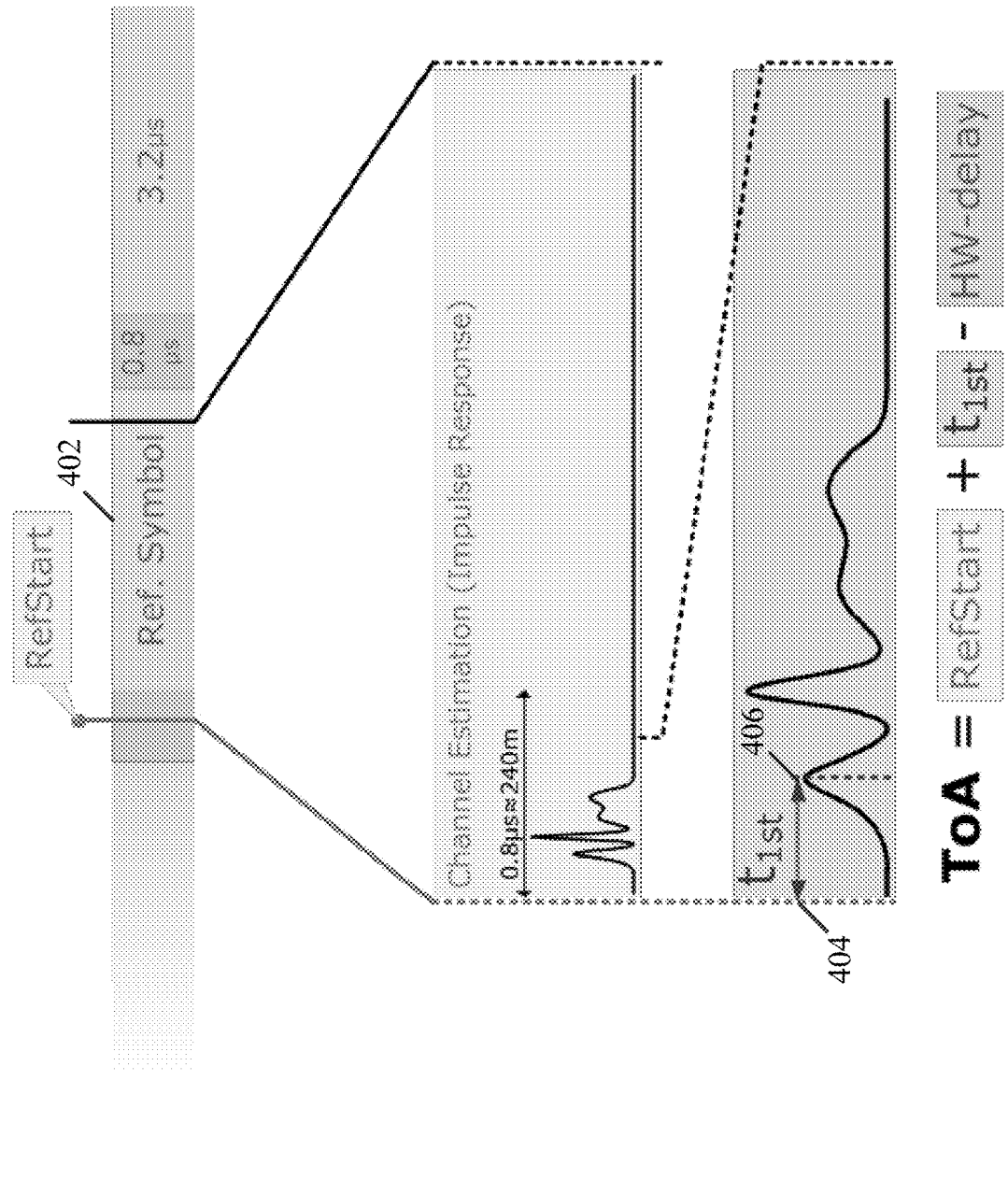
FIG. 4 is a schematic illustration of determining a Time of Arrival (ToA) of a packet, in accordance with some demonstrative embodiments.

Reference is made to FIG. 4, which schematically illustrates a scheme 400 of determining a ToA of a packet, e.g., an NDP, in accordance with some demonstrative embodiments. For example, the TOA of the NDP 134 (FIG. 1) may be determined according to scheme 400.

As shown in FIG. 4, a detected symbol 402 of the packet may be determined, e.g., by device 140 (FIG. 1).

As shown in FIG. 4, a time of a detected beginning 404, denoted RefStart, of the symbol 402, may be determined. For example, the MODEM of device 140 (FIG. 1) may be configured to detect the beginning 404 of the symbol 402 of NDP 134 (FIG. 1).

As shown in FIG. 4, there may be an offset 406, denoted $t_{1st}$, between the detected beginning 404 of the symbol 402 and a ToA of the packet. The offset $t_{1st}$ may be determined, for example, on a channel estimation of the channel over which the packet is received.

In some demonstrative embodiments, the ToA of the packet, e.g., the ToA of the NDP 134 (FIG. 1), may be determined, for example, based on the detected beginning 404 of the symbol 402 and the offset $t_{1st}$, e.g., as follows:

$$ToA=RefStart+t_{1st}-HW\text{-delay} \quad (4)$$

wherein HW-delay denotes a hardware (HW) delay of a receiver of the packet, e.g., a delay of device 140 (FIG. 1).

Referring back to FIG. 1, in some demonstrative embodiments, FTM component 157 may be configured to include in FTM response 162 a time value indicative of the ToA of the NDP 134, e.g., the ToA(NDP1), for example, even without actually calculating the ToA of the NDP 134.

In some demonstrative embodiments, the timing information of the NDP 134 may include, for example, a time value representing the detected beginning of the symbol of NDP 134.

In some demonstrative embodiments, FTM component 157 may be configured to include in FTM response 162 a time value, which is based on the time value RefStart and the delay HW-delay. For example, FTM component 157 may be configured to include in FTM response 162 the difference of RefStart minus HW-delay.

In some demonstrative embodiments, FTM component 117 may be configured to determine the offset $t_{1st}$, for example, by processing the channel information received from device 140 in FTM response 162.

In some demonstrative embodiments, FTM component 117 may use the time value from device 140, for example, to determine the ToA of the NDP 134 (FIG. 1), e.g., according to Equation 4.

In some demonstrative embodiments, determining the ToA of NDP 134 at device 102, e.g., based on the channel information and the timing information provided by device 140 in FTM response 162, may allow device 140 to participate in the FTM procedure, for example, even without requiring device 140 to perform any further and/or dedicated calculation with respect to the ToA of NDP 134.

In one example, FTM component 157 may be configured to determine the time value to be included in FTM response 162, for example, by determining the detected beginning, e.g., detected beginning 404 (FIG. 4), of NDP 134, which may be a parameter from the MODEM of device 140, and the hardware delay of device 140, which may be preconfigured and/or given.

In some demonstrative embodiments, FTM component 117 may determine the accurate value of ToA(NDP1), for example, based on the time value received from device 140, and the offset $t_{1st}$.

In some demonstrative embodiments, FTM component 117 may determine the offset $t_{1st}$ corresponding to NDP 134, for example, based on the channel estimation information of the channel between devices 102 and 140, e.g., as received in FTM response 162.

In some demonstrative embodiments, devices 102 and 140 may be configured to perform the FTM protocol, e.g., even using only a single medium usage. For example, devices 102 and 140 may be able to perform the FTM protocol, for example, by only waiting once for WM 103 to be clear, e.g., as described below.

In some demonstrative embodiments, the NDP 134 may be separated from the FTM request 132 by a first SIFS, the FTM response 162 may be separated from the NDP 134 by a second SIFS, and/or the NDP 164 may be separated from the FTM response 162 by a third SIFS, e.g., as described below with reference to FIG. 5.

Figure 5:
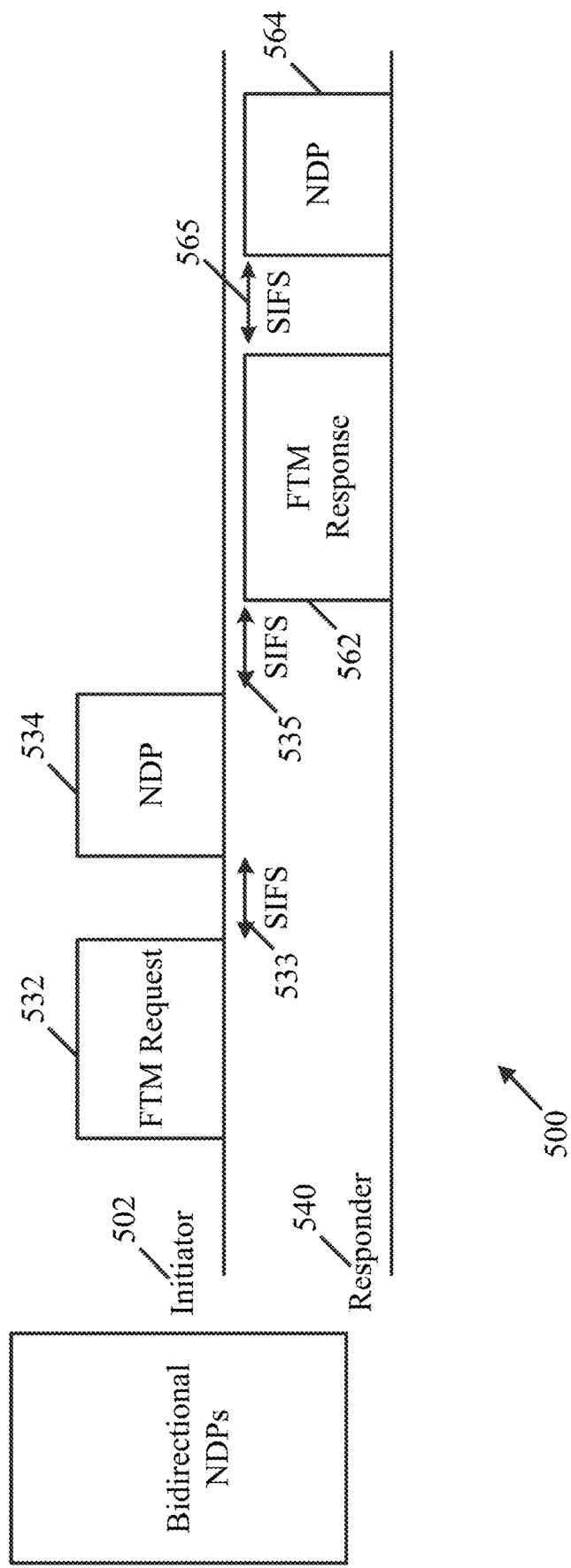
FIG. 5 is a schematic illustration of an FTM protocol, in accordance with some demonstrative embodiments.

Reference is made to FIG. 5, which schematically illustrates an FTM protocol 500 between an initiator 502 and a responder 540, in accordance with some demonstrative embodiments. For example, initiator 502 may perform the functionality of device 102 (FIG. 1); and/or responder 540 may perform the functionality of device 140 (FIG. 1).

In some demonstrative embodiments, as shown in FIG. 5, initiator 502 may transmit an FTM request 532 to responder 540. For example, FTM request 532 may include FTM request 132 (FIG. 1).

In some demonstrative embodiments, as shown in FIG. 5, initiator 502 may transmit an NDP 534 to responder 540, e.g., after FTM request 532. For example, NDP 534, may include NDP 134 (FIG. 1);

In some demonstrative embodiments, as shown in FIG. 5, the NDP 534 may be separated from the FTM request 532 by a first SIFS 533.

In some demonstrative embodiments, as shown in FIG. 5, responder 540 may transmit an FTM response 562 to initiator 502, e.g., after NDP 534. For example, FTM response 562 may include FTM response 162 (FIG. 1).

In some demonstrative embodiments, as shown in FIG. 5, FTM response 562 may be separated from the NDP 534 by a second SIFS 535.

In some demonstrative embodiments, as shown in FIG. 5, responder 540 may transmit an NDP 564 to initiator 502, e.g., after FTM response 562. For example, NDP 564, may include NDP 164 (FIG. 1).

In some demonstrative embodiments, as shown in FIG. 5, the NDP 564 may be separated from the FTM response 562 by a third SIFS 565.

In some demonstrative embodiments, as shown in FIG. 5, one or more communications of scheme 500 may be similar to one or more communications of NDP sounding protocol 300 (FIG. 3). For example, FTM request 532 may replace NDP announce 312 (FIG. 3); and/or FTM response 562 may replace packet 316 (FIG. 3), e.g., the VHT compressed channel message.

In some demonstrative embodiments, FTM response 562 may include a channel response as received by responder 540, e.g., as described above.

Referring back to FIG. 1, in some demonstrative embodiments, using NDPs in the FTM protocol, e.g., as described above, may enable usage of MIMO transmissions for the FTM protocol, e.g., as described below.

In some demonstrative embodiments, FTM component 117 may be configured to control, cause and/or trigger device 102 to transmit the NDP 134 over a MIMO channel.

In some demonstrative embodiments, FTM component 157 may be configured to control, cause and/or trigger device 140 to receive the NDP 134 over the MIMO channel.

In some demonstrative embodiments, FTM component 157 may be configured to control, cause and/or trigger device 140 to transmit the NDP 164 over the MIMO channel.

In some demonstrative embodiments, FTM component 117 may be configured to control, cause and/or trigger device 102 to receive the NDP 164 over the MIMO channel.

In some demonstrative embodiments, FTM component 157 may be configured to control, cause and/or trigger device 102 to determine an angle of arrival and/or an angle of departure of NDP 134, e.g., based on the MIMO transmission of NDP 134.

In some demonstrative embodiments, FTM component 117 may be configured to control, cause and/or trigger device 102 to determine an angle of arrival and/or an angle of departure of NDP 164, e.g., based on the MIMO transmission of NDP 164.

In some demonstrative embodiments, determining an angle of arrival and/or an angle of departure of NDP 164 may enable to reduce a number of FTM measurements, for example, to determine a location of device 102.

In some demonstrative embodiments, determining an angle of arrival and/or an angle of departure of NDP 164 may increase an accuracy of a location estimation of device 102.

In some demonstrative embodiments, another version of the FTM protocol may be based on switching transmissions of the FTM response 162 and the NDP 164. For example, the NDP 164 may be communicated before the FTM response 162.

In some demonstrative embodiments, FTM component 157 may be configured to control, cause and/or trigger device 140 to transmit the NDP 164 prior to FTM response message 162.

Figure 6:
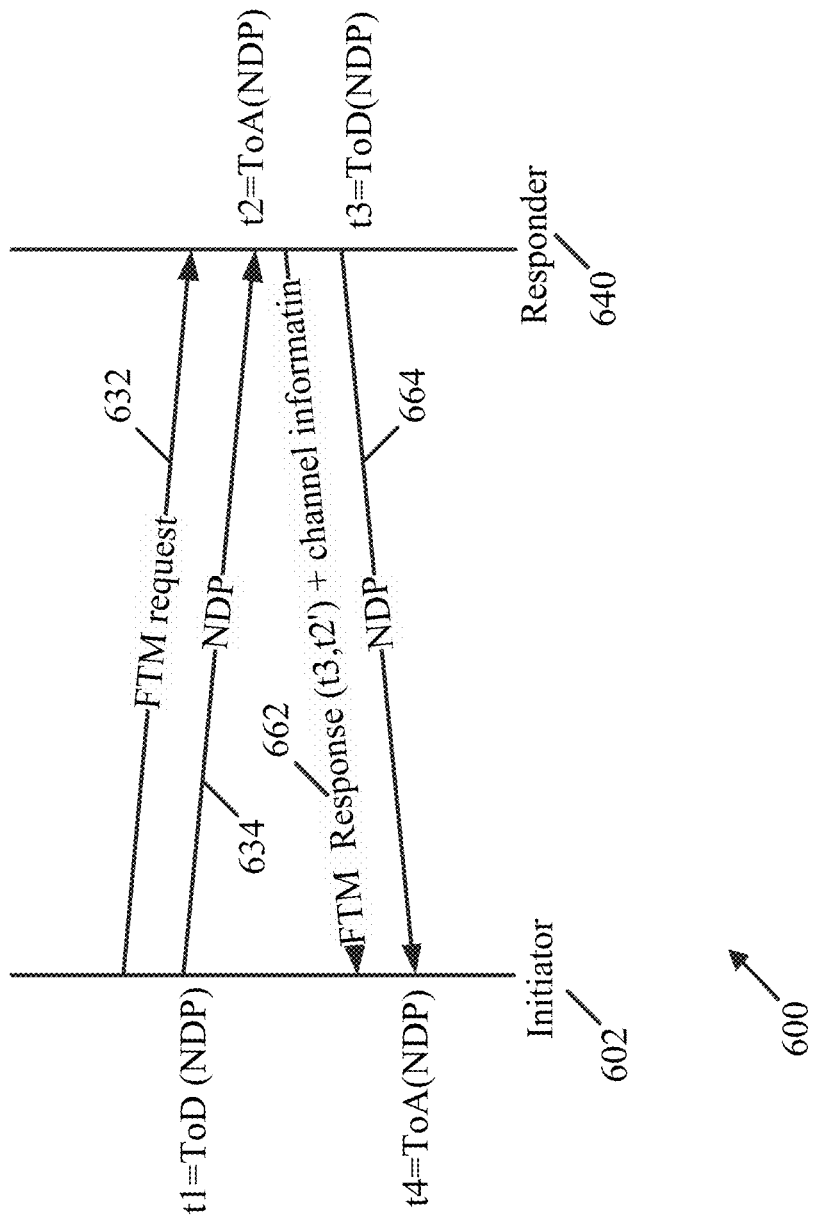
FIG. 6 is a sequence diagram depicting operations and communications between an Initiating station (STA) and a Responding STA, in accordance with some demonstrative embodiments.

Reference is made to FIG. 6, which schematically illustrates a sequence diagram 600, which depicts operations and communications between an initiator device 602 and a responder device 640, in accordance with some demonstrative embodiments. For example, initiator 602 may perform the functionality of device 102 (FIG. 1); and/or responder 640 may perform the functionality of device 140 (FIG. 1).

In some demonstrative embodiments, as shown in FIG. 6, the initiator device 602 may transmit an FTM request 632 message to the responder device 640. For example, FTM request 632 may include FTM request 132 (FIG. 1).

In some demonstrative embodiments, as shown in FIG. 6, the responder device 640 may process the FTM request 632 from the initiator device 602.

In some demonstrative embodiments, as shown in FIG. 6, the initiator device 602 may transmit a first NDP 634, denoted NDP1, to the responder device 640. For example, NDP 634 may include NDP 134 (FIG. 1).

In some demonstrative embodiments, as shown in FIG. 6, device 602 may determine a time value, denoted t1, based on a time a ToD, denoted ToD(NDP1), of NDP 634, for example, t1=TOD(NDP1).

In some demonstrative embodiments, as shown in FIG. 6, the responder device 640 may process the first NDP 634 from the initiator device 602.

In some demonstrative embodiments, as shown in FIG. 6, device 640 may determine a time value, denoted $t_{2'}$, indicative of a ToA, denoted ToA(NDP1), of NDP 634. In one example, the time value $t_{2'}$ may be based on a detected beginning of a symbol of the NDP 634. For example, the time value $t_2$, may be determined based on the timing values RefStart and the delay HW-delay, for example, as described above with reference to FIG. 4, e.g., as follows:

$$t_{2'}=\text{RefStart}-\text{HW-delay} \quad (5)$$

In some demonstrative embodiments, as shown in FIG. 6, the responder device 640 may transmit an FTM response message 662 to the initiator device 602. For example, FTM response 662 may perform the functionality of FTM response 162 (FIG. 1).

In some demonstrative embodiments, as shown in FIG. 6, the initiator device 602 may process the FTM response 662 from the responder device 640.

In some demonstrative embodiments, as shown in FIG. 6, the responder device 640 may transmit a second NDP 664, denoted NDP2, to the initiator device 602. For example, NDP 664 may perform the functionality of NDP 164 (FIG. 1).

In some demonstrative embodiments, as shown in FIG. 6, device 640 may determine a time value, denoted t3, based on a ToD, denoted ToD(NDP2), of NDP 664, for example, t3=TOD(NDP2).

In some demonstrative embodiments, as shown in FIG. 6, FTM response 662 may include, for example, information corresponding to the time value $t_{2'}$, the time value t3, and/or channel information of a channel between initiator device 602 and responder device 640, for example, which may be determined based on the NDP 634.

In some demonstrative embodiments, as shown in FIG. 6, the initiator device 602 may process the second NDP 664 from the responder device 640.

In some demonstrative embodiments, as shown in FIG. 6, device 602 may determine a time value, denoted t4, based on a ToA, denoted ToA(NDP2), of NDP 664, for example, t4=TOA(NDP2).

In some demonstrative embodiments, device 640 may determine a time value, denoted t2, including the ToA (NDP1), e.g., t2=TOA(NDP1), for example, based on the time value $t_{2'}$, and the offset $t_{1st}$, which may be determined, for example, based on channel information of the channel between initiator device 602 and responder device 640, e.g., as follows:

$$t_2=t_{2'}+t_{1st} \quad (6)$$

In some demonstrative embodiments, the initiator device 602 may be configured to determine a ToF between responder device 640 and initiator device 602, for example, based on a computation, applied to the time values t1, t2, t3 and t4. For example, initiator device 602 may determine the ToF, e.g., as follows:

$$\text{ToF}=[(t4-t1)-(t3-t2)]/2 \quad (7)$$

In some demonstrative embodiments, the initiator device 602 may determine the range between devices 602 and 640 based on the calculated ToF, e.g., according to Equation 2.

Referring back to FIG. 1, In some demonstrative embodiments, an FTM protocol including the communication of NDPs 164 and 134 may provide one or more advantages, e.g., as described below.

In some demonstrative embodiments, an FTM protocol including the communication of NDPs 164 and 134 may enable, for example, symmetrical calculation, for example, since NDPs 164 and 134 may be communicated in both directions, e.g., NDP 134 from device 102 to device 140, and NDP 164 from device 140 to device 102.

In some demonstrative embodiments, the symmetrical calculation may enable both sides to perform measurements on the same type of packet, e.g., the NDP. This aspect may provide an important benefit, for example, when performance of ranging is determined equally by both sides and, if, for example, a measurement of one side is degraded, the entire measurement may be affected.

In some demonstrative embodiments, NDPs 164 and 134 may include a sounding packet, which may be configured, for example, according to an NDP used for beamforming (BF). This NDP may be used for ranging, for example, according to the FTM protocol.

In some demonstrative embodiments, NDPs 164 and 134 may enable to achieve diversity, for example, by using more than one antenna. For example, if a Line of Sight (LoS) cannot be detected in one Tx-Rx channel, another pair may be used.

In some demonstrative embodiments, NDPs 164 and 134 may enable an additional gain, e.g., in contrast to a regular BF, for example, by transmitting many preambles in an NDP, e.g., instead of just one preamble for each antenna. For example, transmission may be performed in many different directions, e.g., such that one of the directions may include the LoS direction, which may be easier to identify on the other side.

In some demonstrative embodiments, the FTM protocol described herein may enable single Medium usage, e.g., wherein all packets are communicated a Short Inter-frame Space (SIFS) apart, e.g., as described above with reference to FIG. 5.

In some demonstrative embodiments, the FTM protocol described herein may eliminate a need of an initiating device to wait for a calculation of the TOA of the NDP received at the responder, e.g., by allowing the initiator to perform the calculation of the ToA of the NDP, e.g., as described above. For example, the initiating device may be allowed to return to a main channel, or go to a sleep mode, e.g., instead of waiting for the calculation.

In some demonstrative embodiments, the FTM protocol described herein may enable, for example, a full MIMO and/or precoding support.

In some demonstrative embodiments, the FTM protocol described herein may enable, for example, a symmetrical measurement, e.g., as both sides may perform measurements on an NDP.

In some demonstrative embodiments, the FTM protocol described herein may enable, for example, a very short measurement time for an FTM measurement, e.g., about 0.5 milliseconds (ms).

In some demonstrative embodiments, the FTM protocol described herein may enable, for example, a scalable mechanism, for example, as the initiating device may perform computations, for example, including the calculation of the ToA of the NDP sent to the responder device, e.g., as described above, for example, while reducing the burden of the computations at the responder. In one example, a maximum of about five additional calculations per second may be performed at the initiating device, for example, to calculate the ToA of the NDP sent to the responder device, e.g., as described above.

In some demonstrative embodiments, the FTM protocol described herein may enable, for example, the initiating device to be dependent only on its own algorithm of line of sight (LoS) detection.

In some demonstrative embodiments, the FTM protocol described herein may be advantageous in one or more additional or alternative aspects.

Figure 7:
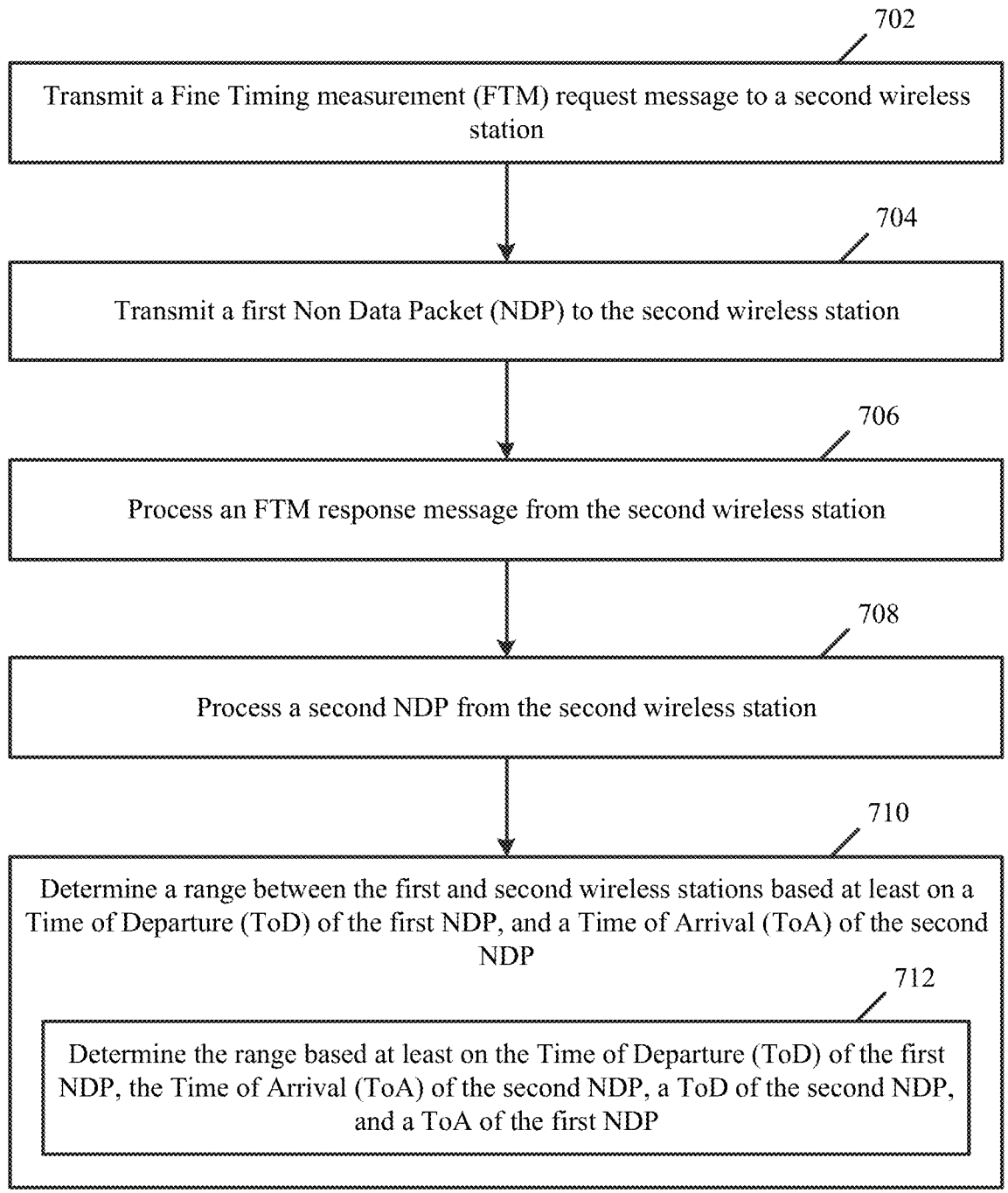
FIG. 7 is a schematic flow-chart illustration of a method of FTM, in accordance with some demonstrative embodiments.

Reference is made to FIG. 7, which schematically illustrates a method of FTM, in accordance with some demonstrative embodiments. For example, one or more of the operations of the method of FIG. 7 may be performed by a wireless communication system, e.g., system 100 (FIG. 1); a wireless communication device, e.g., devices 102 and/or 140 (FIG. 1); a controller, e.g., controllers 124 and/or 154 (FIG. 1); an FTM component, e.g., FTM components 117 and/or 157 (FIG. 1); a location estimator, e.g., location estimator 115 (FIG. 1); a radio, e.g., radios 114 and/or 144 (FIG. 1); a message processor, e.g., message processor 128 (FIG. 1) and/or message processor 158 (FIG. 1), a transmitter, e.g., transmitters 118 and/or 148 (FIG. 1); and/or a receiver, e.g., receivers 116 and/or 146 (FIG. 1).

As indicated at block 702, the method may include transmitting an FTM request message from a first wireless station to a second wireless station. For example, FTM component 117 (FIG. 1) may control, cause and/or trigger device 102 to transmit the FTM request message 632 (FIG. 6) to device 140 (FIG. 1), e.g., as described above.

As indicated at block 704, the method may include transmitting a first NDP from the first wireless station to the second wireless station. For example, FTM component 117 (FIG. 1) may control, cause and/or trigger device 102 to transmit the NDP 634 (FIG. 6) to device 140 (FIG. 1), e.g., as described above.

As indicated at block 706, the method may include processing an FTM response message from the second wireless station. For example, FTM component 117 (FIG. 1) may control, cause and/or trigger device 102 to process the FTM response 662 (FIG. 6) from device 140 (FIG. 1), e.g., as described above.

As indicated at block 708, the method may include processing a second NDP from the second wireless station. For example, FTM component 117 (FIG. 1) may control, cause and/or trigger device 102 to process the NDP 664 (FIG. 6) from device 140 (FIG. 1), e.g., as described above.

As indicated at block 710, the method may include determining a range between the first and second wireless stations based at least on a Time of Departure (ToD) of the first NDP, and a Time of Arrival (ToA) of the second NDP. For example, FTM component 117 (FIG. 1) may determine the range between devices 102 and 140 (FIG. 1), for example, based on the TOD(NDP1) of NDP 634 (FIG. 6) and the TOA(NDP2) of NDP 664 (FIG. 6), e.g., as described above.

As indicated at block 712, determining the range between the first and second wireless stations may include determining the range based at least on the Time of Departure (ToD) of the first NDP, the Time of Arrival (ToA) of the second NDP, a ToD of the second NDP, and a ToA of the first NDP. For example, FTM component 117 (FIG. 1) may determine the range between devices 102 and 140 (FIG. 1), for example, based on the TOD(NDP1) of NDP 634 (FIG. 6), the TOA(NDP2) of NDP 664 (FIG. 6), the TOA(NDP1) of NDP 634 (FIG. 6), and the TOD(NDP2) of NDP 664 (FIG. 6), e.g., as described above.

Figure 8:
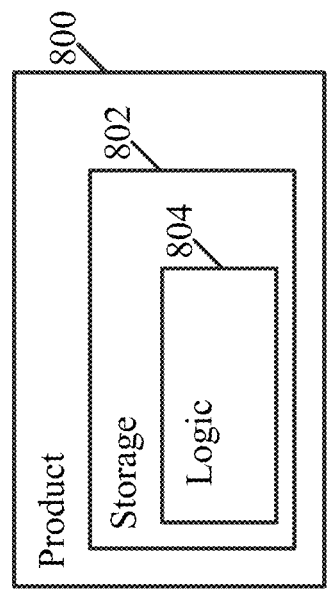
FIG. 8 is a schematic illustration of a product, in accordance with some demonstrative embodiments.

Reference is made to FIG. 8, which schematically illustrates a product of manufacture 800, in accordance with some demonstrative embodiments. Product 800 may include one or more tangible computer-readable non-transitory storage media 802, which may include computer-executable instructions, e.g., implemented by logic 804, operable to, when executed by at least one computer processor, enable the at least one computer processor to implement one or more operations at devices 102 and/or 140 (FIG. 1), radios 114 and/or 144 (FIG. 1), transmitters 118 and/or 148 (FIG. 1), receivers 116 and/or 146 (FIG. 1), controllers 124 and/or 154 (FIG. 1), message processors 128 and/or 158 (FIG. 1), FTM components 117 and/or 157 (FIG. 1), location estimator 115 (FIG. 1), and/or to perform one or more operations descried above with reference to FIGS. 1, 2, 3, 4, 5, 6 and/or 7, and/or one or more operations described herein. The phrase "non-transitory machine-readable medium" is directed to include all computer-readable media, with the sole exception being a transitory propagating signal.

In some demonstrative embodiments, product 800 and/or machine-readable storage medium 802 may include one or more types of computer-readable storage media capable of storing data, including volatile memory, non-volatile memory, removable or non-removable memory, erasable or non-erasable memory, writeable or re-writeable memory, and the like. For example, machine-readable storage medium 802 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 804 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 804 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising circuitry and logic configured to cause a first wireless station to transmit a Fine Timing measurement (FTM) request message to a second wireless station; transmit a first Non Data Packet (NDP) to the second wireless station; process an FTM response message from the second wireless station; and process a second NDP from the second wireless station.

Example 2 includes the subject matter of Example 1, and optionally, wherein the apparatus is configured to cause the first wireless station to determine a range between the first and second wireless stations based at least on a Time of Departure (ToD) of the first NDP, and a Time of Arrival (ToA) of the second NDP.

Example 3 includes the subject matter of Example 1 or 2, and optionally, wherein the apparatus is configured to cause the first wireless station to determine a range between the first and second wireless stations based at least on a Time of Departure (ToD) of the first NDP, a Time of Arrival (ToA) of the first NDP, a ToD of the second NDP, and a ToA of the second NDP.

Example 4 includes the subject matter of any one of Examples 1-3, and optionally, wherein the FTM response comprises timing information indicative of a Time of Arrival (ToA) of the first NDP, and a Time of Departure (ToD) of the second NDP.

Example 5 includes the subject matter of any one of Examples 1-4, and optionally, wherein the FTM response comprises timing information of the first NDP, a Time of Departure (ToD) of the second NDP, and channel estimation information.

Example 6 includes the subject matter of Example 5, and optionally, wherein the timing information of the first NDP comprises a time value, which is based on a detected beginning of a symbol of the first NDP.

Example 7 includes the subject matter of Example 5 or 6, and optionally, wherein the apparatus is configured to cause the first wireless station to determine a Time of Arrival (ToA) of the first NDP, based on the timing information of the first NDP and the channel estimation information.

Example 8 includes the subject matter of any one of Examples 1-7, and optionally, wherein the first NDP is separated from the FTM request by a first Short Inter-Frame Space (SIFS), the FTM response is separated from the first NDP by a second SIFS, and the second NDP is separated from the FTM response by a third SIFS.

Example 9 includes the subject matter of any one of Examples 1-8, and optionally, wherein the apparatus is configured to cause the first wireless station to transmit the first NDP over a Multiple In Multiple Out (MIMO) channel.

Example 10 includes the subject matter of any one of Examples 1-9, and optionally, wherein the apparatus is configured to cause the first wireless station to determine, based on the second NDP, at least one angle selected from the group consisting of an angle of arrival of the second NDP, and an angle of departure of the second NDP.

Example 11 includes the subject matter of any one of Examples 1-10, and optionally, wherein the second NDP is prior to the FTM response message.

Example 12 includes the subject matter of any one of Examples 1-11, and optionally, comprising a radio to transmit the FTM request and the first NDP, and to receive the FTM response and the second NDP.

Example 13 includes the subject matter of any one of Examples 1-12, and optionally, comprising one or more antennas, a memory, and a processor.

Example 14 includes a system of wireless communication comprising a first wireless station, the first wireless station comprising one or more antennas; a memory; a processor; a radio; and a controller configured to cause the first wireless station to transmit a Fine Timing measurement (FTM) request message to a second wireless station; transmit a first Non Data Packet (NDP) to the second wireless station; process an FTM response message from the second wireless station; and process a second NDP from the second wireless station.

Example 15 includes the subject matter of Example 14, and optionally, wherein the first wireless station to determine a range between the first and second wireless stations based at least on a Time of Departure (ToD) of the first NDP, and a Time of Arrival (ToA) of the second NDP.

Example 16 includes the subject matter of Example 14 or 15, and optionally, wherein the first wireless station is to determine a range between the first and second wireless stations based at least on a Time of Departure (ToD) of the first NDP, a Time of Arrival (ToA) of the first NDP, a ToD of the second NDP, and a ToA of the second NDP.

Example 17 includes the subject matter of any one of Examples 14-16, and optionally, wherein the FTM response comprises timing information indicative of a Time of Arrival (ToA) of the first NDP, and a Time of Departure (ToD) of the second NDP.

Example 18 includes the subject matter of any one of Examples 14-17, and optionally, wherein the FTM response comprises timing information of the first NDP, a Time of Departure (ToD) of the second NDP, and channel estimation information.

Example 19 includes the subject matter of Example 18, and optionally, wherein the timing information of the first NDP comprises a time value, which is based on a detected beginning of a symbol of the first NDP.

Example 20 includes the subject matter of Example 18 or 19, and optionally, wherein the first wireless station is to determine a Time of Arrival (ToA) of the first NDP, based on the timing information of the first NDP and the channel estimation information.

Example 21 includes the subject matter of any one of Examples 14-20, and optionally, wherein the first NDP is separated from the FTM request by a first Short Inter-Frame Space (SIFS), the FTM response is separated from the first NDP by a second SIFS, and the second NDP is separated from the FTM response by a third SIFS.

Example 22 includes the subject matter of any one of Examples 14-21, and optionally, wherein the first wireless station is to transmit the first NDP over a Multiple In Multiple Out (MIMO) channel.

Example 23 includes the subject matter of any one of Examples 14-22, and optionally, wherein the first wireless station is to determine, based on the second NDP, at least one angle selected from the group consisting of an angle of arrival of the second NDP, and an angle of departure of the second NDP.

Example 24 includes the subject matter of any one of Examples 14-23, and optionally, wherein the second NDP is prior to the FTM response message.

Example 25 includes a method to be performed at a first wireless station, the method comprising transmitting a Fine Timing measurement (FTM) request message to a second wireless station; transmitting a first Non Data Packet (NDP) to the second wireless station; processing an FTM response message from the second wireless station; and processing a second NDP from the second wireless station.

Example 26 includes the subject matter of Example 25, and optionally, comprising determining a range between the first and second wireless stations based at least on a Time of Departure (ToD) of the first NDP, and a Time of Arrival (ToA) of the second NDP.

Example 27 includes the subject matter of Example 25 or 26, and optionally, comprising determining a range between the first and second wireless stations based at least on a Time of Departure (ToD) of the first NDP, a Time of Arrival (ToA) of the first NDP, a ToD of the second NDP, and a ToA of the second NDP.

Example 28 includes the subject matter of any one of Examples 25-27, and optionally, wherein the FTM response comprises timing information indicative of a Time of Arrival (ToA) of the first NDP, and a Time of Departure (ToD) of the second NDP.

Example 29 includes the subject matter of any one of Examples 25-28, and optionally, wherein the FTM response comprises timing information of the first NDP, a Time of Departure (ToD) of the second NDP, and channel estimation information.

Example 30 includes the subject matter of Example 29, and optionally, wherein the timing information of the first NDP comprises a time value, which is based on a detected beginning of a symbol of the first NDP.

Example 31 includes the subject matter of Example 29 or 30, and optionally, comprising determining a Time of Arrival (ToA) of the first NDP, based on the timing information of the first NDP and the channel estimation information.

Example 32 includes the subject matter of any one of Examples 25-31, and optionally, wherein the first NDP is separated from the FTM request by a first Short Inter-Frame Space (SIFS), the FTM response is separated from the first NDP by a second SIFS, and the second NDP is separated from the FTM response by a third SIFS.

Example 33 includes the subject matter of any one of Examples 25-32, and optionally, comprising transmitting the first NDP over a Multiple In Multiple Out (MIMO) channel.

Example 34 includes the subject matter of any one of Examples 25-33, and optionally, comprising determining, based on the second NDP, at least one angle selected from the group consisting of an angle of arrival of the second NDP, and an angle of departure of the second NDP.

Example 35 includes the subject matter of any one of Examples 25-34, and optionally, wherein the second NDP is prior to the FTM response message.

Example 36 includes a product including one or more tangible computer-readable non-transitory storage media comprising computer-executable instructions operable to, when executed by at least one computer processor, enable the at least one computer processor to implement operations at a first wireless station, the operations comprising transmitting a Fine Timing measurement (FTM) request message to a second wireless station; transmitting a first Non Data Packet (NDP) to the second wireless station; processing an FTM response message from the second wireless station; and processing a second NDP from the second wireless station.

Example 37 includes the subject matter of Example 36, and optionally, wherein the operations comprise determining a range between the first and second wireless stations based at least on a Time of Departure (ToD) of the first NDP, and a Time of Arrival (ToA) of the second NDP.

Example 38 includes the subject matter of Example 36 or 37, and optionally, wherein the operations comprise determining a range between the first and second wireless stations based at least on a Time of Departure (ToD) of the first NDP, a Time of Arrival (ToA) of the first NDP, a ToD of the second NDP, and a ToA of the second NDP.

Example 39 includes the subject matter of any one of Examples 36-38, and optionally, wherein the FTM response comprises timing information indicative of a Time of Arrival (ToA) of the first NDP, and a Time of Departure (ToD) of the second NDP.

Example 40 includes the subject matter of any one of Examples 36-39, and optionally, wherein the FTM response comprises timing information of the first NDP, a Time of Departure (ToD) of the second NDP, and channel estimation information.

Example 41 includes the subject matter of Example 40, and optionally, wherein the timing information of the first NDP comprises a time value, which is based on a detected beginning of a symbol of the first NDP.

Example 42 includes the subject matter of Example 40 or 41, and optionally, wherein the operations comprise determining a Time of Arrival (ToA) of the first NDP, based on the timing information of the first NDP and the channel estimation information.

Example 43 includes the subject matter of any one of Examples 36-42, and optionally, wherein the first NDP is separated from the FTM request by a first Short Inter-Frame Space (SIFS), the FTM response is separated from the first NDP by a second SIFS, and the second NDP is separated from the FTM response by a third SIFS.

Example 44 includes the subject matter of any one of Examples 36-43, and optionally, wherein the operations comprise transmitting the first NDP over a Multiple In Multiple Out (MIMO) channel.

Example 45 includes the subject matter of any one of Examples 36-44, and optionally, wherein the operations comprise determining, based on the second NDP, at least one angle selected from the group consisting of an angle of arrival of the second NDP, and an angle of departure of the second NDP.

Example 46 includes the subject matter of any one of Examples 36-45, and optionally, wherein the second NDP is prior to the FTM response message.

Example 47 includes an apparatus of wireless communication by a first wireless station, the apparatus comprising means for transmitting a Fine Timing measurement (FTM) request message to a second wireless station; means for transmitting a first Non Data Packet (NDP) to the second wireless station; means for processing an FTM response message from the second wireless station; and means for processing a second NDP from the second wireless station.

Example 48 includes the subject matter of Example 47, and optionally, comprising means for determining a range between the first and second wireless stations based at least on a Time of Departure (ToD) of the first NDP, and a Time of Arrival (ToA) of the second NDP.

Example 49 includes the subject matter of Example 47 or 48, and optionally, comprising means for determining a range between the first and second wireless stations based at least on a Time of Departure (ToD) of the first NDP, a Time of Arrival (ToA) of the first NDP, a ToD of the second NDP, and a ToA of the second NDP.

Example 50 includes the subject matter of any one of Examples 47-49, and optionally, wherein the FTM response comprises timing information indicative of a Time of Arrival (ToA) of the first NDP, and a Time of Departure (ToD) of the second NDP.

Example 51 includes the subject matter of any one of Examples 47-50, and optionally, wherein the FTM response comprises timing information of the first NDP, a Time of Departure (ToD) of the second NDP, and channel estimation information.

Example 52 includes the subject matter of Example 51, and optionally, wherein the timing information of the first NDP comprises a time value, which is based on a detected beginning of a symbol of the first NDP.

Example 53 includes the subject matter of Example 51 or 52, and optionally, comprising means for determining a Time of Arrival (ToA) of the first NDP, based on the timing information of the first NDP and the channel estimation information.

Example 54 includes the subject matter of any one of Examples 47-53, and optionally, wherein the first NDP is separated from the FTM request by a first Short Inter-Frame Space (SIFS), the FTM response is separated from the first NDP by a second SIFS, and the second NDP is separated from the FTM response by a third SIFS.

Example 55 includes the subject matter of any one of Examples 47-54, and optionally, comprising means for transmitting the first NDP over a Multiple In Multiple Out (MIMO) channel.

Example 56 includes the subject matter of any one of Examples 47-55, and optionally, comprising means for determining, based on the second NDP, at least one angle selected from the group consisting of an angle of arrival of the second NDP, and an angle of departure of the second NDP.

Example 57 includes the subject matter of any one of Examples 47-56, and optionally, wherein the second NDP is prior to the FTM response message.

Example 58 includes an apparatus comprising circuitry and logic configured to cause a first wireless station to process a Fine Timing measurement (FTM) request message from a second wireless station; process a first Non Data Packet (NDP) from the second wireless station; transmit an FTM response message to the second wireless station; and transmit a second NDP to the second wireless station.

Example 59 includes the subject matter of Example 58, and optionally, wherein the FTM response comprises timing information indicative of a Time of Arrival (ToA) of the first NDP, and a Time of Departure (ToD) of the second NDP.

Example 60 includes the subject matter of Example 58 or 59, and optionally, wherein the FTM response comprises timing information of the first NDP, a Time of Departure (ToD) of the second NDP, and channel estimation information.

Example 61 includes the subject matter of Example 60, and optionally, wherein the timing information of the first NDP comprises a time value, which is based on a detected beginning of a symbol of the first NDP.

Example 62 includes the subject matter of any one of Examples 58-61, and optionally, wherein the first NDP is separated from the FTM request by a first Short Inter-Frame Space (SIFS), the FTM response is separated from the first NDP by a second SIFS, and the second NDP is separated from the FTM response by a third SIFS.

Example 63 includes the subject matter of any one of Examples 58-62, and optionally, wherein the apparatus is configured to cause the first wireless station to transmit the second NDP over a Multiple In Multiple Out (MIMO) channel.

Example 64 includes the subject matter of any one of Examples 58-63, and optionally, wherein the apparatus is configured to cause the first wireless station to determine, based on the first NDP, at least one angle selected from the group consisting of an angle of arrival of the first NDP, and an angle of departure of the first NDP.

Example 65 includes the subject matter of any one of Examples 58-64, and optionally, wherein the apparatus is configured to cause the first wireless station to transmit the second NDP prior to the FTM response message.

Example 66 includes the subject matter of any one of Examples 58-65, and optionally, comprising a radio to receive the FTM request and the first NDP, and to transmit the FTM response and the second NDP.

Example 67 includes the subject matter of any one of Examples 58-66, and optionally, comprising one or more antennas, a memory, and a processor.

Example 68 includes a system of wireless communication comprising a first wireless station, the first wireless station comprising one or more antennas; a memory; a processor; a radio; and a controller configured to cause the first wireless station to process a Fine Timing measurement (FTM) request message from a second wireless station; process a first Non Data Packet (NDP) from the second wireless station; transmit an FTM response message to the second wireless station; and transmit a second NDP to the second wireless station.

Example 69 includes the subject matter of Example 68, and optionally, wherein the FTM response comprises timing information indicative of a Time of Arrival (ToA) of the first NDP, and a Time of Departure (ToD) of the second NDP.

Example 70 includes the subject matter of Example 68 or 69, and optionally, wherein the FTM response comprises timing information of the first NDP, a Time of Departure (ToD) of the second NDP, and channel estimation information.

Example 71 includes the subject matter of Example 70, and optionally, wherein the timing information of the first NDP comprises a time value, which is based on a detected beginning of a symbol of the first NDP.

Example 72 includes the subject matter of any one of Examples 68-71, and optionally, wherein the first NDP is separated from the FTM request by a first Short Inter-Frame Space (SIFS), the FTM response is separated from the first NDP by a second SIFS, and the second NDP is separated from the FTM response by a third SIFS.

Example 73 includes the subject matter of any one of Examples 68-72, and optionally, wherein the first wireless station is to transmit the second NDP over a Multiple In Multiple Out (MIMO) channel.

Example 74 includes the subject matter of any one of Examples 68-73, and optionally, wherein the first wireless station is to determine, based on the first NDP, at least one angle selected from the group consisting of an angle of arrival of the first NDP, and an angle of departure of the first NDP.

Example 75 includes the subject matter of any one of Examples 68-74, and optionally, wherein the first wireless station is to transmit the second NDP prior to the FTM response message.

Example 76 includes a method to be performed at a first wireless station, the method comprising processing a Fine Timing measurement (FTM) request message from a second wireless station; processing a first Non Data Packet (NDP) from the second wireless station; transmitting an FTM response message to the second wireless station; and transmitting a second NDP to the second wireless station.

Example 77 includes the subject matter of Example 76, and optionally, wherein the FTM response comprises timing information indicative of a Time of Arrival (ToA) of the first NDP, and a Time of Departure (ToD) of the second NDP.

Example 78 includes the subject matter of Example 76 or 77, and optionally, wherein the FTM response comprises timing information of the first NDP, a Time of Departure (ToD) of the second NDP, and channel estimation information.

Example 79 includes the subject matter of Example 78, and optionally, wherein the timing information of the first NDP comprises a time value, which is based on a detected beginning of a symbol of the first NDP.

Example 80 includes the subject matter of any one of Examples 76-79, and optionally, wherein the first NDP is separated from the FTM request by a first Short Inter-Frame Space (SIFS), the FTM response is separated from the first NDP by a second SIFS, and the second NDP is separated from the FTM response by a third SIFS.

Example 81 includes the subject matter of any one of Examples 76-80, and optionally, comprising transmitting the second NDP over a Multiple In Multiple Out (MIMO) channel.

Example 82 includes the subject matter of any one of Examples 76-81, and optionally, comprising determining, based on the first NDP, at least one angle selected from the group consisting of an angle of arrival of the first NDP, and an angle of departure of the first NDP.

Example 83 includes the subject matter of any one of Examples 76-82, and optionally, comprising transmitting the second NDP prior to the FTM response message.

Example 84 includes a product including one or more tangible computer-readable non-transitory storage media comprising computer-executable instructions operable to, when executed by at least one computer processor, enable the at least one computer processor to implement operations at a first wireless station, the operations comprising processing a Fine Timing measurement (FTM) request message from a second wireless station; processing a first Non Data Packet (NDP) from the second wireless station; transmitting an FTM response message to the second wireless station; and transmitting a second NDP to the second wireless station.

Example 85 includes the subject matter of Example 84, and optionally, wherein the FTM response comprises timing information indicative of a Time of Arrival (ToA) of the first NDP, and a Time of Departure (ToD) of the second NDP.

Example 86 includes the subject matter of Example 84 or 85, and optionally, wherein the FTM response comprises timing information of the first NDP, a Time of Departure (ToD) of the second NDP, and channel estimation information.

Example 87 includes the subject matter of Example 86, and optionally, wherein the timing information of the first NDP comprises a time value, which is based on a detected beginning of a symbol of the first NDP.

Example 88 includes the subject matter of any one of Examples 84-87, and optionally, wherein the first NDP is separated from the FTM request by a first Short Inter-Frame Space (SIFS), the FTM response is separated from the first NDP by a second SIFS, and the second NDP is separated from the FTM response by a third SIFS.

Example 89 includes the subject matter of any one of Examples 84-88, and optionally, wherein the operations comprise transmitting the second NDP over a Multiple In Multiple Out (MIMO) channel.

Example 90 includes the subject matter of any one of Examples 84-89, and optionally, wherein the operations comprise determining, based on the first NDP, at least one angle selected from the group consisting of an angle of arrival of the first NDP, and an angle of departure of the first NDP.

Example 91 includes the subject matter of any one of Examples 84-90, and optionally, wherein the operations comprise transmitting the second NDP prior to the FTM response message.

Example 92 includes an apparatus of wireless communication by a first wireless station, the first wireless station means for processing a Fine Timing measurement (FTM) request message from a second wireless station; means for processing a first Non Data Packet (NDP) from the second wireless station; means for transmitting an FTM response message to the second wireless station; and means for transmitting a second NDP to the second wireless station.

Example 93 includes the subject matter of Example 92, and optionally, wherein the FTM response comprises timing information indicative of a Time of Arrival (ToA) of the first NDP, and a Time of Departure (ToD) of the second NDP.

Example 94 includes the subject matter of Example 92 or 93, and optionally, wherein the FTM response comprises timing information of the first NDP, a Time of Departure (ToD) of the second NDP, and channel estimation information.

Example 95 includes the subject matter of Example 94, and optionally, wherein the timing information of the first NDP comprises a time value, which is based on a detected beginning of a symbol of the first NDP.

Example 96 includes the subject matter of any one of Examples 92-95, and optionally, wherein the first NDP is separated from the FTM request by a first Short Inter-Frame Space (SIFS), the FTM response is separated from the first NDP by a second SIFS, and the second NDP is separated from the FTM response by a third SIFS.

Example 97 includes the subject matter of any one of Examples 92-96, and optionally, comprising means for transmitting the second NDP over a Multiple In Multiple Out (MIMO) channel.

Example 98 includes the subject matter of any one of Examples 92-97, and optionally, comprising means for determining, based on the first NDP, at least one angle selected from the group consisting of an angle of arrival of the first NDP, and an angle of departure of the first NDP.

Example 99 includes the subject matter of any one of Examples 92-98, and optionally, comprising means for transmitting the second NDP prior to the FTM response message.

Functions, operations, components and/or features described herein with reference to one or more embodiments, may be combined with, or may be utilized in combination with, one or more other functions, operations, components and/or features described herein with reference to one or more other embodiments, or vice versa.

While certain features of have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
   memory circuitry; and
   a processor comprising logic and circuitry configured to cause a responder wireless communication station (STA) to:
   process a first message from an initiator STA, the first message to initiate a Fine Timing Measurement (FTM) sequence with the responder STA;
   determine first information based on receipt of a first Null Data Packet (NDP) from the initiator STA, the first NDP after the first message;
   transmit a second NDP to the initiator STA, the second NDP after the first NDP; and
   transmit a second message to the initiator STA after the second NDP, the second message comprising the first information, and second information corresponding to a Time of Departure (ToD) of the second NDP from the responder STA.

2. The apparatus of claim 1, wherein the first information comprises Time of Arrival (ToA) information corresponding to a ToA of the first NDP at the responder STA.

3. The apparatus of claim 1, wherein the first information is based on a channel estimation corresponding to the first NDP.

4. The apparatus of claim 1, wherein the first NDP is separated from the first message by a first Short Inter-Frame Space (SIFS), the second NDP is separated from the first NDP by a second SIFS, and the second message is separated from the second NDP by a third SIFS.

5. The apparatus of claim 1 configured to cause the responder STA to determine at least one of an angle of arrival or an angle of departure of the first NDP.

6. The apparatus of claim 1 configured to cause the responder STA to determine a Round Trip Time (RTT) measurement based on the first information.

7. The apparatus of claim 1 comprising a radio to receive the first message and the first NDP, and to transmit the second NDP and the second message.

8. The apparatus of claim 7 comprising one or more antennas connected to the radio, and another processor to execute instructions of an operating system.

9. A product for a wireless communication device, the product comprising:
   one or more tangible computer-readable non-transitory storage media comprising computer-executable instructions operable to, when executed by at least one processor, enable the at least one processor to cause a responder wireless communication station (STA) to:
   process a first message from an initiator STA, the first message to initiate a Fine Timing Measurement (FTM) sequence with the responder STA;
   determine first information based on receipt of a first Null Data Packet (NDP) from the initiator STA, the first NDP after the first message;
   transmit a second NDP to the initiator STA, the second NDP after the first NDP; and
   transmit a second message to the initiator STA after the second NDP, the second message comprising the first information, and second information corresponding to a Time of Departure (ToD) of the second NDP from the responder STA.

10. The product of claim 9, wherein the first information comprises Time of Arrival (ToA) information corresponding to a ToA of the first NDP at the responder STA.

11. The product of claim 9, wherein the first information is based on a channel estimation corresponding to the first NDP.

12. The product of claim 9, wherein the first NDP is separated from the first message by a first Short Inter-Frame Space (SIFS), the second NDP is separated from the first NDP by a second SIFS, and the second message is separated from the second NDP by a third SIFS.

13. The product of claim 9, wherein the instructions, when executed, cause the responder STA to determine at least one of an angle of arrival or an angle of departure of the first NDP.

14. The product of claim 9, wherein the instructions, when executed, cause the responder STA to determine a Round Trip Time (RTT) measurement based on the first information.

15. An apparatus comprising:
   means for processing at a responder wireless communication station (STA) a first message from an initiator STA, the first message to initiate a Fine Timing Measurement (FTM) sequence with the responder STA;
   means for determining first information based on receipt of a first Null Data Packet (NDP) from the initiator STA, the first NDP after the first message;
   means for causing the responder STA to transmit a second NDP to the initiator STA, the second NDP after the first NDP; and
   means for causing the responder STA to transmit a second message to the initiator STA after the second NDP, the second message comprising the first information, and second information corresponding to a Time of Departure (ToD) of the second NDP from the responder STA.

16. The apparatus of claim 15, wherein the first information comprises Time of Arrival (ToA) information corresponding to a ToA of the first NDP at the responder STA.

17. The apparatus of claim 15, wherein the first information is based on a channel estimation corresponding to the first NDP.

18. The apparatus of claim 15, wherein the first NDP is separated from the first message by a first Short Inter-Frame Space (SIFS), the second NDP is separated from the first NDP by a second SIFS, and the second message is separated from the second NDP by a third SIFS.

19. The apparatus of claim 15 comprising means for determining at least one of an angle of arrival or an angle of departure of the first NDP.

20. The apparatus of claim 15 comprising radio means to receive the first message and the first NDP, and to transmit the second NDP and the second message.

* * * * *